United States Patent [19]

Hanyu et al.

[11] 4,343,248
[45] Aug. 10, 1982

[54] PATTERN SELECTING SYSTEM OF AN ELECTRONIC SEWING MACHINE

[75] Inventors: Susumu Hanyu; Hideaki Takenoya, both of Hachioji; Toshiro Fujimura, Musashino, all of Japan

[73] Assignee: Janome Sewing Machine Co. Ltd., Tokyo, Japan

[21] Appl. No.: 88,868

[22] Filed: Oct. 29, 1979

[30] Foreign Application Priority Data

Apr. 20, 1978 [JP] Japan .................................. 53/45904

[51] Int. Cl.³ ............................................. D05B 3/02
[52] U.S. Cl. ................................................ 112/158 E
[58] Field of Search ........... 112/158 E, 158 F, 121.11, 112/121.12

[56] References Cited

U.S. PATENT DOCUMENTS

| | | | |
|---|---|---|---|
| 4,122,786 | 10/1978 | Tanimoto et al. | 112/158 E |
| 4,177,744 | 12/1979 | Wurst et al. | 112/158 E |
| 4,181,086 | 1/1980 | Takenoya et al. | 112/158 E X |
| 4,275,674 | 6/1981 | Carbonato et al. | 112/158 E |
| 4,290,377 | 9/1981 | Hanyu et al. | 112/158 E |

Primary Examiner—Peter P. Nerbun
Attorney, Agent, or Firm—Michael J. Striker

[57] ABSTRACT

A pattern selecting system is disclosed in which a single set of push buttons is utilized to select a first group of patterns each of which corresponds to a particular push button and a second group of patterns indicated by a series of two figure numbers.

1 Claim, 5 Drawing Figures

A : Indication of first group of patterns
B : Indication of second group of patterns
1 : Pattern selecting part
2 : Latch circuit 4
3 : Pulse generator
4 : Latch circuit 1
5 : Decoder
6 : Electric bight and feed control device
7 : Latch circuit 2
8 : 7- segment decoder
9 : Latch circuit 3
10 : 7- segment decoder

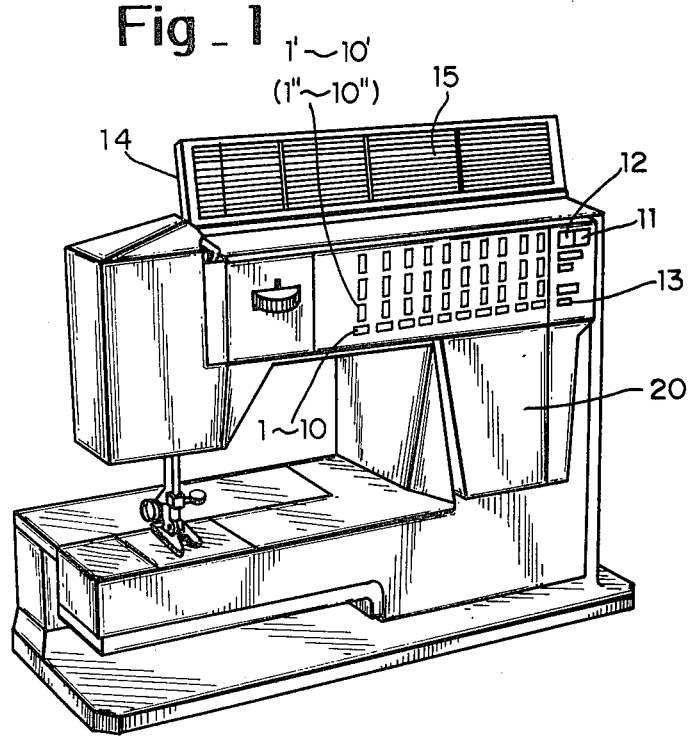
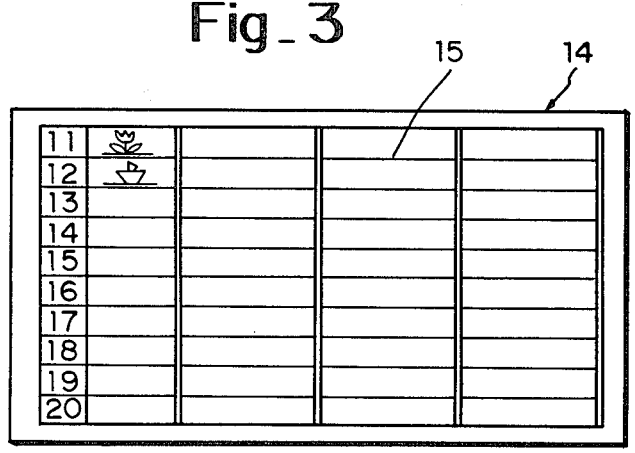

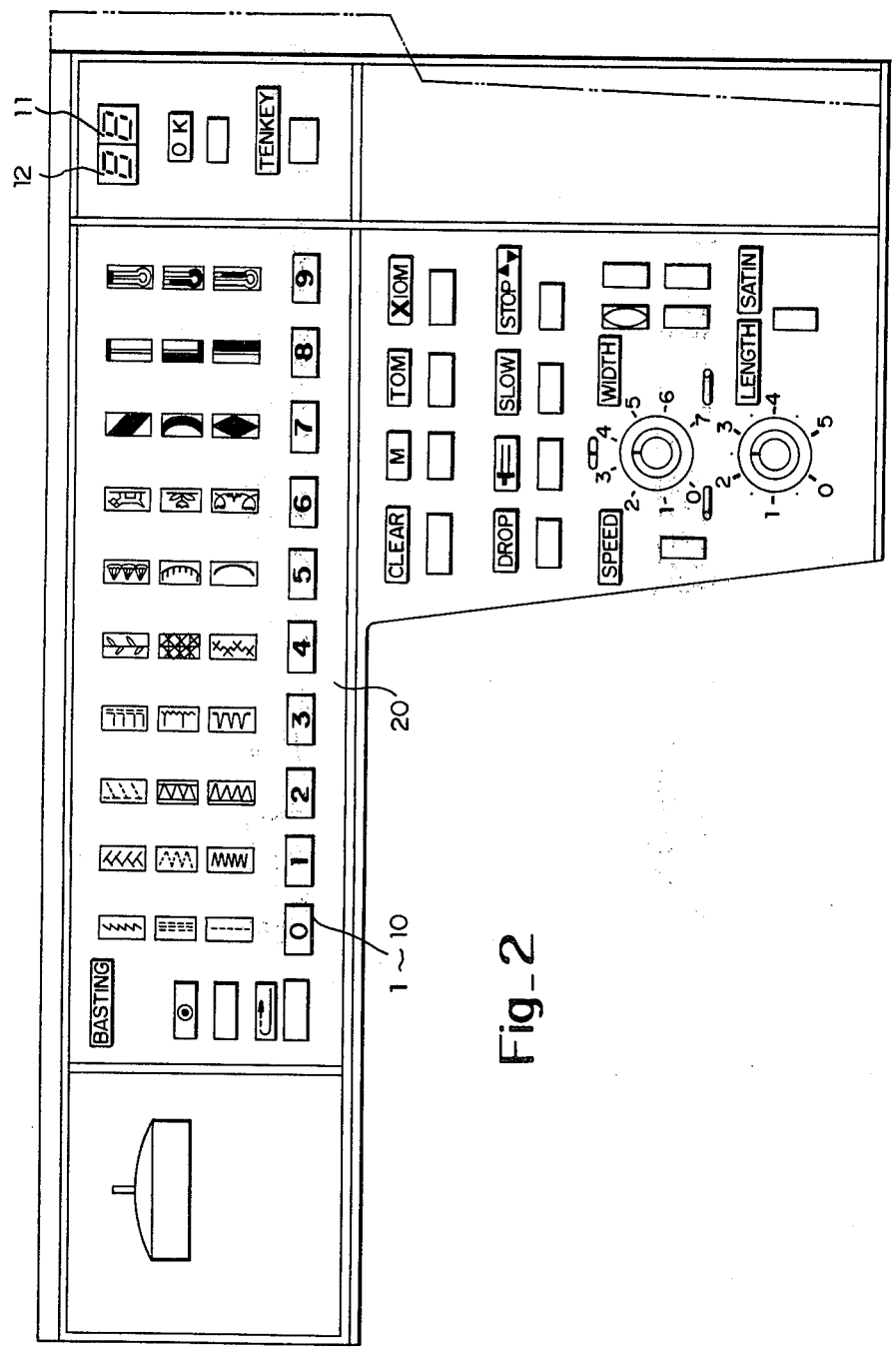
Fig_2

Fig_4
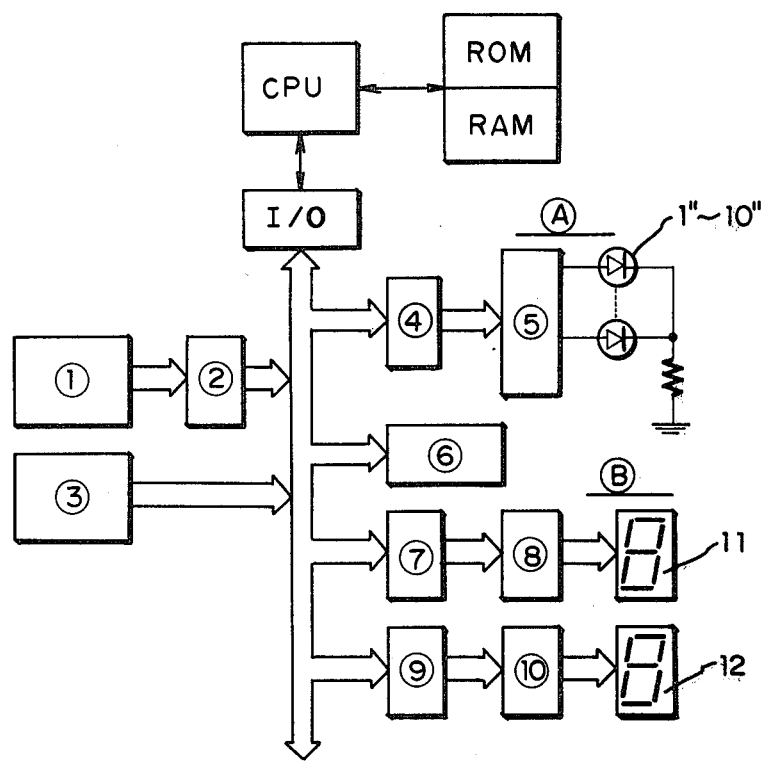
A : Indication of first group of patterns
B : Indication of second group of patterns
1 : Pattern selecting part
2 : Latch circuit 4
3 : Pulse generator
4 : Latch circuit 1
5 : Decoder
6 : Electric bight and feed control device
7 : Latch circuit 2    8 : 7- segment decoder
9 : Latch circuit 3    10 : 7- segment decoder

Fig_5

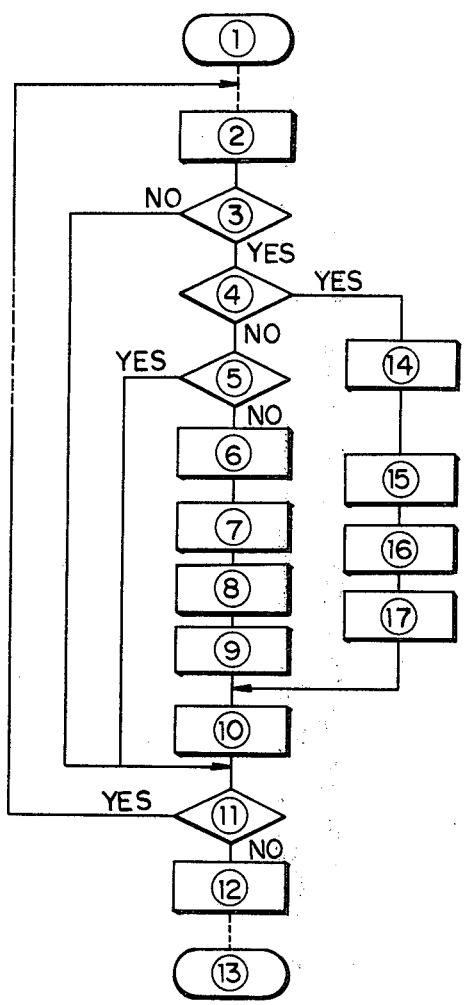

1 : Start
2 : Reading up of 1 - 10
3 : If the push button is newly pushed or not
4 : If the switch 13 is pushed or not
5 : If the selected pattern is same or not
6 : N = 0
7 : Register M1 is rendered of a signal of no indication
8 : Register M2 is rendered of a signal of no indication
9 : Read up value is transferred into register M3
10 : Contents of registers M1, M2, M3 are applied to the indicating parts
11 : N = 1 or not
12 : Program is carried out as it is determined by the contents of registers M1, M2, M3
13 : RET
14 : N = N+1
15 : A signal of no indication is transferred into register M3
16 : Content of register M1 is transferred into register M2
17 : Read up value is transferred into register M1

PATTERN SELECTING SYSTEM OF AN ELECTRONIC SEWING MACHINE

BRIEF DESCRIPTION OF THE INVENTION

The present invention relates to a pattern selecting system of an electronic sewing machine, in which the normally and frequently used pattern selecting switches may be utilized by operation of a separate switch to select patterns which are very specific and not so frequently selected.

The stitch patterns of the electronic sewing machine are stored as a pattern information in an electronic memory element. Now such a memory element has been made so small by the improvement of a semi-conductor integration technique. Although the memory element is small, it may store a considerable amount of stitch data as compared with the mechanical memory such as cams. In the electronic sewing machine, the pattern selection is performed by distinguishing electric signals for selectively calling up the stored data. That is, the pattern selection in general requires the pattern selecting switches which are each operated in response to desired patterns, the pattern indicating parts and the selection indicating lamps each lights to indicate the selection of a pattern. Such pattern selection requirements will be increased more as the electronic sewing machine stores many patterns. However, a space of a sewing machine is limited for mounting the pattern selecting system of so many selection requirements. If so many patterns are prepared on the sewing machine, each of the members necessary to the selection should be made small accordingly. As a result, the pattern selecting operation becomes difficult. If we consider the necessity of the patterns to be stitched, it is found out that some are frequently employed and some are seldom employed.

In view of these circumstances involved in the use frequency, the present invention has been devised to provide a pattern selecting system suited to the electronic sewing machine which stores a lot of the patterns.

Therefore, according to the invention, the frequently used patterns are provided as a first group of patterns on the front panel of the sewing machine each in association with the corresponding pattern selecting switches and indicating lamps. On the other hand, the patterns not so frequently used are provided as a second group of patterns in a normally concealed part such as on the underside of the top plate of the sewing machine. For selecting such a second group of patterns, a separate change-over switch is provided, which is operated to change the switches for the first group of patterns to function for selecting the second group of patterns.

The other features and advantages of the invention will be apparent from the following description of the invention in reference to a preferred embodiment as shown in the attached drawings.

BRIEF DESCRIPTION OF THE DRAWINGS

FIG. 1 is a perspective view of a sewing machine provided with a pattern selecting system of the invention, FIG. 2 is an enlarged view of a main part of the invention, FIG. 3 is an enlarged view of the under side of the top plate of the sewing machine of the invention, FIG. 4 is an electric control block diagram of the invention, and, FIG. 5 is a flow chart of the control diagram.

DETAILED DESCRIPTION OF THE INVENTION

The present invention will be explained in reference to the attached drawings. In reference to FIG. 1, the reference numerals 1 to 10 are pattern selecting push buttons, 1' to 10' are pattern indications in the first group which are to be frequently used. The reference numerals 1" to 10" are selection indicating lamps of light emitting diodes which are each arranged inwardly of the pattern indications 1' to 10' to light each of the latter when a pattern of the first group is selected. The reference numerals 11 and 12 are number-indicating parts of 1 segment for the patterns of a second group which are not so frequently used. Numeral 13 is a switch which is pushed to change the function of the pattern selecting switches 1 to 10. In a condition that the switch 13 is not pushed and is in the first position, the buttons 1 to 10 serve for selecting the first group of patterns, and the selected patterns are indicated on the indicating parts 1' to 10' by the indicating lamps 1" to 10".

When the switch 13 is pushed and in the second position, the patterns of the second group are selected with two figures indicated in the indicating parts 11, 12 by continuously operating any of the switch buttons having numbers 0 to 9 as shown in FIG. 2. In this case, when the switch 13 is pushed, the top plate 14 of the sewing machine is released and is opened by a spring (not shown) as shown in FIG. 1. On the under side 15 of the top plate, the patterns of the second group and the necessary explanations thereof are provided in the form as shown in FIG. 3.

A next reference will be made to a selecting control of the patterns of the first group by the control block diagram in FIG. 4. A micro-computer composed of a central processing unit CPU, a read-only-memory ROM, a random-access-memory RAM and an input-output port I/O, receives a signal issued from the pulse generator in synchronism with rotation of the upper shaft of the sewing machine and a signal from the pattern selecting part including the pattern selecting push buttons 1 to 10, and gives a signal to a selected one of the pattern selection indicating lamps 1" to 10" and gives a stitch signal to the electric bight and feed control devices of the sewing machine per rotation of the sewing machine in accordance to a program stored in the memory ROM as shown in the flow chart in FIG. 5, thereby to form the stitches of the selected pattern.

The selection of the patterns of the first and second groups will be explained in reference to FIGS. 4 and 5. Selection of the first group of patterns can be carried out by pushing the push buttons 1 to 10. That is, if one of the push buttons 1 to 10 is pushed in a condition that the switch 13 is not pushed and is in the first position, the pattern selecting signal is read into the random-access-memory RAM of the micro-computer via the latch circuit 4 to change the value of M1 register for controlling the 7-segment indicating device 11 of said memory, and also change the value of M2 register for controlling the indicating device 12, and also change the value of M3 register for controlling the indicating lamps 1" to 10", thereby to select one of the patterns 1' to 10', and light the corresponding one of the indicating lamps 1" to 10" via the decoder, and thus the selected pattern is produced when the sewing machine is driven by operating the controller (not shown). A reference letter "N" in the flow chart is a discriminating signal stored in the memory RAM to discriminate figures of the 7-segment indications 11, 12 in the selection of the second group of patterns.

The selection of the second group of patterns is as follows; the switch 13 is pushed into the second position and the patterns and the corresponding numbers in all two figures are known from the pattern indicating table on the under side 15 of the top plate 14. If a desired pattern has a number 8 8, the pattern can be selected by pushing twice the push button 8 of the push buttons 0 to 9. In this case, if the push button 8 is pushed, the number is indicated in the indicating part 12, and the signal N becomes 1 and then if the push button is pushed once more, the number is indicated in the indicating part and the signal N becomes 2, since in the meantime the contents of M1 register, M2 register and M3 register are replaced. In this case, the lamps 1″ to 10″ do not light. Thus the program is carried out for stitching the selected pattern of the second group.

We claim:

1. A pattern selecting system for an electronic sewing machine, comprising an electronic memory storing a plurality of pattern data in a first group displayed on the machine and another plurality of numbered pattern data in a second group in which each pattern data number is a two-figure number; pattern selecting means including a plurality of push buttons each corresponding to displayed pattern data of the first group; and switching means having a first operating position in which it enables said push buttons to select any of the pattern data of the first group, and a second operating position in which it enables said push buttons to select any of the two-figure numbers corresponding to the pattern data of the second group.

* * * * *